(12) United States Patent
Cederlind et al.

(10) Patent No.: US 12,724,737 B2
(45) Date of Patent: Sep. 1, 2026

(54) TRANSPARENT SERIAL PERIPHERAL INTERFACE FOR USE WITH ANALOG-TO-DIGITAL CONVERTER

(71) Applicant: Eldec Aerospace Corp., Lynnwood, WA (US)

(72) Inventors: Gregory F. Cederlind, Woodinville, WA (US); Jeff Lamping, Snohomish, WA (US)

(73) Assignee: Eldec Aerospace Corp., Lynwood, WA (US)

( * ) Notice: Subject to any disclaimer, the term of this patent is extended or adjusted under 35 U.S.C. 154(b) by 26 days.

(21) Appl. No.: 18/660,158

(22) Filed: May 9, 2024

(65) Prior Publication Data

US 2025/0348452 A1 Nov. 13, 2025

(51) Int. Cl.
*G06F 13/42* (2006.01)

(52) U.S. Cl.
CPC .. *G06F 13/4282* (2013.01); *G06F 2213/0002* (2013.01)

(58) Field of Classification Search
None
See application file for complete search history.

(56) References Cited

U.S. PATENT DOCUMENTS

| | | | | |
|---|---|---|---|---|
| 8,620,243 | B2 | 12/2013 | Thompson et al. | |
| 11,520,721 | B2 | 12/2022 | Trivedi et al. | |
| 2006/0184335 | A1 * | 8/2006 | Odom | G16H 40/63 702/127 |
| 2016/0378153 | A1 * | 12/2016 | Kelly | G06F 13/4022 713/300 |
| 2021/0212771 | A1 | 7/2021 | Shelton, IV et al. | |
| 2022/0083477 | A1 * | 3/2022 | Hutchinson | G06F 13/122 |

FOREIGN PATENT DOCUMENTS

| | | | |
|---|---|---|---|
| CN | 209784267 | U | 12/2019 |
| CN | 117148749 | A | 12/2023 |

OTHER PUBLICATIONS

International Search Report and Written Opinion of the International Searching Authority dated Jul. 18, 2025, in connection with International Application No. PCT/US2025/028732, 11 pages.

* cited by examiner

*Primary Examiner* — Farley Abad
*Assistant Examiner* — Dayton Lewis-Taylor

(57) ABSTRACT

An apparatus includes a serial peripheral interface (SPI) enabling the apparatus to communicate with an external component over an SPI bus. An analog to digital (A/D) converter is connected to the SPI and communicates with the external component over the SPI bus. A memory is connected to the SPI. The memory has a predetermined storage area for data enabling operation of the A/D converter with the external component over the SPI bus. The data enabling operation is uniquely associated with the A/D converter.

16 Claims, 2 Drawing Sheets

402
ELECTRONIC DEVICE
EEPROM
414
412
A/D
414
SPI BUS
408
CS PINS
410
SOFTWARE
404

TRANSPARENT SERIAL PERIPHERAL INTERFACE FOR USE WITH ANALOG-TO-DIGITAL CONVERTER

TECHNICAL FIELD

The following disclosure relates to analog-to-digital converters, and more particularly, to a system and method for providing a transparent serial peripheral interface for analog-to-digital converters within electronic devices.

BACKGROUND

Some existing electronic devices, such as EEPROMS, are configured to be standardized with respect to communications over a serial peripheral interface (SPI). Thus, when the electronic device is replaced with a new electronic device that is from a different manufacturer or a different version of the original electronic device, the electronic device may still communicate over the SPI due to previously configured generic SPI interface of the electronic device.

Analog-to-digital (A/D) converters are different in this respect because they generally have a different SPI interface across many types of A/D converters. Thus, if one A/D converter is removed from an electronic device and replaced with a new A/D converter of different manufacturer or type, the new A/D converter will be unable to communicate over the SPI interface and carryout set up initialization of the A/D converter. This requires external devices interacting with the A/D converter to be reprogrammed or configured in order to enable communications with the A/D converter over the serial peripheral interface. This is a time-consuming and expensive process especially for any software in a tightly regulated environment such as aerospace. Thus, there is a need for providing for seamless replacement of a A/D converters within electronic devices while still maintaining the ability of the A/D converter to communicate over the serial peripheral interface without reprogramming of associated devices.

SUMMARY

The present disclosure illustrates embodiments of an apparatus for providing a transparent serial peripheral interface for devices including an analog to digital converter.

A first embodiment comprises an apparatus includes a serial peripheral interface (SPI) enabling the apparatus to communicate with an external component over an SPI bus. An analog to digital (A/D) converter is connected to the SPI and communicates with the external component over the SPI bus. A memory is connected to the SPI. The memory has a predetermined storage area for data enabling operation of the A/D converter with the external component over the SPI bus. The data enabling operation is uniquely associated with the A/D converter.

In a second embodiment, a system comprises an external component and an electronic device. The electronic device comprises a serial peripheral interface (SPI) enabling the electronic devise to communicate with the external component over a SPI bus. An analog to digital (A/D) converter is connected to the SPI and also communicates with the external component over the SPI bus. A memory is connected to the SPI. The memory has a predetermined storage area for data enabling operation of the A/D converter with the external component over the SPI bus. The data enabling operation is uniquely associated with the A/D converter.

In a third embodiment, a method for providing a transparent serial peripheral interface (SPI) for and analog to digital (A/D) converter comprises detecting connection of an external component to an electronic device containing the A/D converter, initializing operation of the electronic device containing the A/D converter responsive to the detected connection, enabling the external component to communicate with the electronic device containing the A/D converter over an SPI bus through a serial peripheral interface (SPI), accessing a memory location within the electronic device containing data enabling operation of the A/D converter with the external component, wherein the data enabling operation is uniquely associated with the A/D converter, transmitting the data enabling operation of the A/D converter from the memory location to the external component, receiving the data enabling operation of the A/D converter at the A/D converter from the external component and enabling operation of the A/D converter with the external component responsive to the received data at the A/D converter.

The above embodiments wherein the memory comprises an electrically erasable programmable read only memory (EEPROM).

The above embodiments wherein the external component comprises a field programmable gate array.

The above embodiments wherein the external component comprises software.

The above embodiments wherein the data enabling operation of the A/D converter comprise initialization and configuration data.

The above embodiments wherein responsive to initialization of the external component with the apparatus the data enabling operation is transmitted from the memory to the external device and further wherein the A/D converter receives the data enabling operation from the external device prior to enable operation of the A/D converter with respect to the external component.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings in which like reference numerals represent like parts.

DETAILED DESCRIPTION

FIGS. 1 through 4, discussed below, and the various embodiments used to describe the principles of the present disclosure are by way of illustration only and should not be construed in any way to limit the scope of the disclosure. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
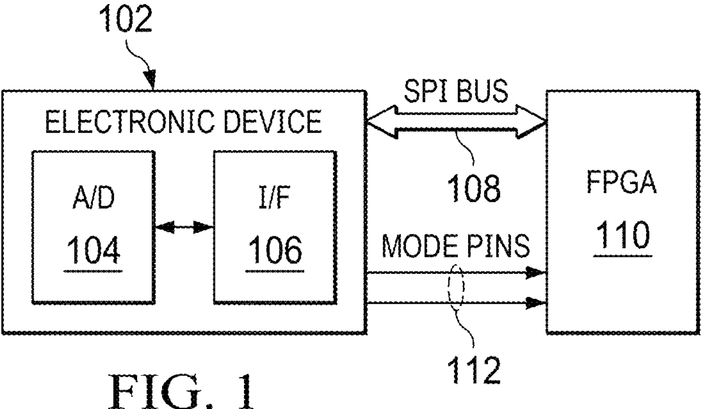
FIG. 1 illustrates a block diagram of an A/D converter within an electronic device communicating with an FPGA that does not have a transparent interface.

FIG. 1 illustrates a configuration wherein an electronic device having a A/D converter 104 communicates using a serial peripheral interface (SPI) 106 over a SPI bus 108 with a field programmable gate array (FPGA) 110. Interconnection between the FPGA 110 and the electronic device 102 comprises the SPI bus 108 and mode pins 112. The serial peripheral interface (SPI) is a de facto standard for synchronous serial communications for short distance wired communications between circuits. SPI uses a master-slave architecture where one main device orchestrates communication with some number of peripheral (sub) devices by driving the clock signal and chip select signals to the sub devices.

Within A/D converters 104 communications over the SPI bus 108 using the SPI interface 106 require a predetermined initialization and configuration process. The initialization and configuration process is preconfigured into the FPGA 110 that is communicating with the A/D converter 104 within the electronic device 102. This initialization and configuration process between the FPGA 110 and the A/D converter 104 works seamlessly until a replacement of the A/D converter is necessary. If the same A/D converter 104 is installed within the electronic device 102 in order to replace the previous A/D converter, then there is no issue. However, if a different version or manufacture of A/D converter 104 is installed within the electronic device 102, the initialization and configuration communications over the SPI bus 108 may not take place. This is due to the fact that each type of A/D converter 104 often has a unique initialization and configuration process and communication protocols associated therewith and are not generic over the SPI interface 106. This would require the alteration of the programming within the FPGA 110 in order to account for the newly installed type of A/D converter 104.

Figure 2:
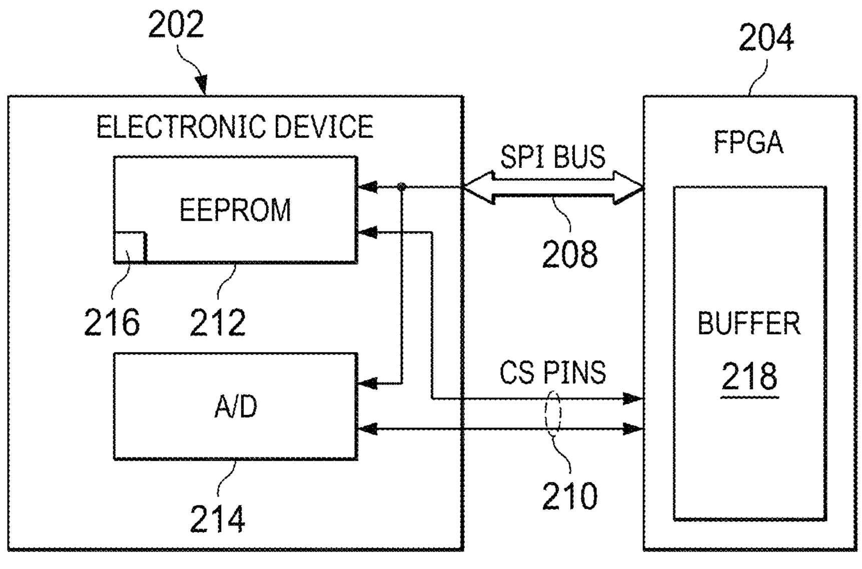
FIG. 2 illustrates a system for providing a transparent serial peripheral interface for an A/D converter within an electronic device.

Referring now to FIG. 2, there is illustrated a system for providing a transparent SPI interface between electronic device 202 and field programmable gate array 204. The electronic device 202 includes a serial peripheral interface that enables communications with the FPGA 204 over a SPI bus 208. Chip Select (CS) lines 210 for from the FPGA 204 to the EEPROM 212 and A/D converter 214. The electronic device 202 may comprise any type of electronic device including an A/D converter or a pressure sensor, temperature sensor, etc.

The electronic device 202 further includes an electrically erasable programmable read-only memory (EEPROM) 212 for storing various types of information associated with the electronic device 202. The A/D converter 214 communicates through the SPI interface with the FPGA 204 over the SPI bus 208. The A/D converter 214 has unique initialization and configuration information that enables the FPGA 204 to communicate with the A/D converter 214 over the SPI bus 208. This initialization and configuration information is stored at a specific memory location 216 within the EEPROM 212. By storing the initialization and configuration information within the unique memory location 216 of the EEPROM 212, the FPGA 204 may be configured to communicate with any version or manufacture of the A/D converter 214. Over the SPI interface.

Upon initial connection of the FPGA 204 with the electronic device 202, the FPGA 204 is configured to initially access the memory location 216 within the EEPROM 212 that contains the initialization and configuration information for the A/D converter 214. Initialization and configuration information is downloaded from the memory location 216 of the EEPROM 212 to a buffer 218 of the FPGA 204 over the SPI bus 208. This initialization and configuration information is then transmitted from the buffer 218 of the FPGA 204 to the A/D converter 214 of the electronic device 202. Responsive to this initialization and configuration information, the A/D converter may then communicate with the FPGA 204 over the SPI interface.

By storing the initialization and configuration information within a predetermined memory location 216 of the EEPROM 212, the particular A/D converter 214 that is installed within the electronic device 202 becomes generic to the serial peripheral interface. Since the FPGA 204 is preconfigured to always access the memory location 216 within the EEPROM 212 containing the initialization and configuration information for the A/D converter 214, if the A/D converter 214 is ever changed for a different A/D converter, the hardware A/D converter 214 is changed within the electronic device 202 and the initialization and configuration information associated with the new A/D converter 214 is stored within the memory location 216 of the EEPROM 212. Thus, the next time the FPGA 204 initializes with respect to the electronic device 202 having the updated A/D converter 214, the new initialization and configuration information will be accessed from the memory location 216 of the EEPROM 212 enabling the FPGA 204 to interact with the new A/D converter 214 seamlessly.

Figures 3, 4:
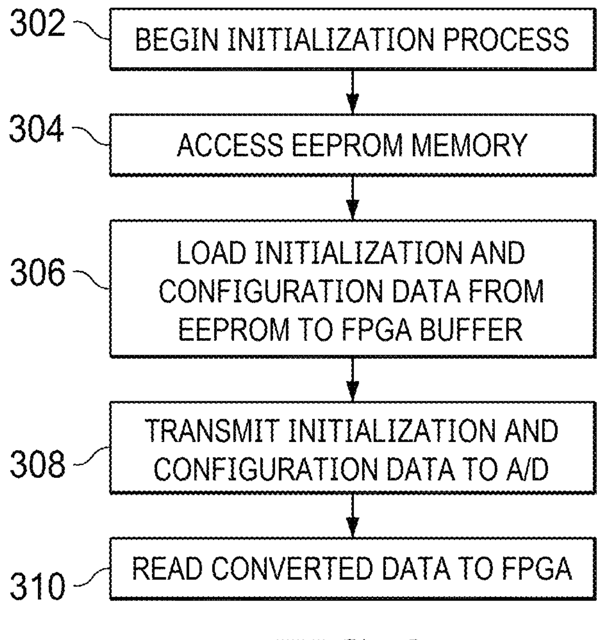
FIG. 3 illustrates a flow diagram of the process for initializing an A/D converter according to the system of FIG. 2.
FIG. 4 illustrates an alternative embodiment of a system for providing a transparent serial peripheral interface for an A/D converter communicating with software.

Referring now to FIG. 3, there is illustrated a flow diagram describing the operation of the FPGA 204 with respect to the A/D converter 214 of the electronic device 202. The initialization process between a FPGA 204 and the A/D converter 214 begins at step 302 when the devices are first interconnected. Responsive to the initialization, the FPGA 204 will access memory location 216 of the double EEPROM 212 through the SPI interface of the electronic device 202 through the SPI bus 208. Upon accessing the memory location 216, the initialization and configuration data for the A/D converter 214 is loaded from the memory location 216 to the buffer 218 within the FPGA 204. The loading from the electronic device 202 memory location 216 to the buffer 218 occurs over the SPI bus 208. The information loaded into the buffer 218 of the FPGA 204 is then loaded to the A/D converter 214 from the FPGA 204. This initiates communications between the FPGA 204 and the A/D converter 214 enabling the A/D converter to provide converted digital signals to the FPGA 204 over the SPI interface 206.

Referring now to FIG. 4, there is illustrated a system for providing a transparent SPI interface between electronic device 402 and software 404. The electronic device 402 includes a serial peripheral interface that enables communications with the software 404 over a SPI bus 408. Chip Select (CS) lines 410 for from the software 404 to the EEPROM 412 and A/D converter 414. The electronic device 402 may comprise any type of electronic device including an A/D converter or a pressure sensor, temperature sensor, etc.

The electronic device 402 further includes an electrically erasable programmable read-only memory (EEPROM) 412 for storing various types of information associated with the electronic device 402. The A/D converter 414 communicates through the SPI interface with the software 404 over the SPI bus 408. The A/D converter 414 has unique initialization and configuration information that enables the software 404 to communicate with the A/D converter 414 over the SPI bus 408. This initialization and configuration information is stored at a specific memory location 416 within the EEPROM 412. By storing the initialization and configuration information within the unique memory location 416 of the EEPROM 412, the software 404 may be configured to communicate with any version or manufacture of the A/D converter 414. Over the SPI interface.

Upon initial connection of the software 404 with the electronic device 402, the software 404 is configured to initially access the memory location 416 within the EEPROM 412 that contains the initialization and configuration information for the A/D converter 414. Initialization and configuration information is downloaded from the memory location 416 of the EEPROM 412 to a buffer within the software 404 over the SPI bus 408. This initialization and configuration information is then transmitted from the buffer of the software 404 to the A/D converter 414 of the electronic device 402. Responsive to this initialization and configuration information, the A/D converter 414 may then communicate with the software 404 over the SPI interface.

By storing the initialization and configuration information within a predetermined memory location 416 of the EEPROM 412, the particular A/D converter 414 that is installed within the electronic device 402 becomes generic to the serial peripheral interface. Since the software 404 is preconfigured to always access the memory location 416 within the EEPROM 412 containing the initialization and configuration information for the A/D converter 414, if the A/D converter 414 is ever changed for a different A/D converter, the hardware A/D converter 414 is changed within the electronic device 402 and the initialization and configuration information associated with the new A/D converter 414 is stored within the memory location 416 of the EEPROM 412. Thus, the next time the software 404 initializes with respect to the electronic device 402 having the updated A/D converter 414, the new initialization and configuration information will be accessed from the memory location 416 of the EEPROM 412 enabling the software 404 to interact with the new A/D converter 414 seamlessly.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

a serial peripheral interface (SPI) enabling the apparatus to communicate with an external component over an SPI bus;

an analog to digital (A/D) converter connected to the SPI and communicates with the external component over the SPI bus; and a memory connected to the SPI, the memory having a predetermined storage area for initialization and configuration data enabling operation of the A/D converter with the external component over the SPI bus, wherein the initialization and configuration data enabling operation is uniquely associated with the A/D converter, wherein the initialization and configuration data enabling operation is transmitted from the memory and stored in a buffer associated with the external component and transmitted from the buffer to the A/D converter responsive to initialization of the external component with the apparatus.

2. The apparatus of claim 1, wherein the memory comprises an electrically erasable programmable read only memory (EEPROM).

3. The apparatus of claim 1, wherein the external component comprises a field programmable gate array.

4. The apparatus of claim 1, wherein the external component comprises software.

5. The apparatus of claim 1, wherein responsive to initialization of the external component with the apparatus the initialization and configuration data enabling operation is transmitted from the memory to the external component and further wherein the A/D converter receives the initialization and configuration data enabling operation from the external component prior to enable operation of the A/D converter with respect to the external component.

6. A system comprising:

an external component;

a buffer associated with the external component; and an electronic device, comprising:

a serial peripheral interface (SPI) enabling the electronic device to communicate with the external component over an SPI bus;

an analog to digital (A/D) converter connected to the SPI and also communicates with the external component over the SPI bus; and a memory connected to the SPI, the memory having a predetermined storage area for data enabling operation of the A/D converter with the external component over the SPI bus, wherein the data enabling operation is uniquely associated with the A/D converter, wherein the data enabling operation from the memory is transmitted from the memory and stored in the buffer and transmitted from the buffer to the A/D converter responsive to initialization of the external component with the electronic device.

7. The system of claim 6, wherein the memory comprises an electrically erasable programmable read only memory (EEPROM).

8. The system of claim 6, wherein the external component comprises a field programmable gate array.

9. The system of claim 6, wherein the external component comprises software.

10. The system of claim 6, wherein the data enabling operation of the A/D converter comprise initialization and configuration data.

11. The system of claim 6, wherein the A/D converter receives the data enabling operation from the external component prior to enable operation of the A/D converter with respect to the external component.

12. A method for providing a transparent serial peripheral interface (SPI) for an analog to digital (A/D) converter comprising:

detecting a connection of an external component to an electronic device containing the A/D converter;

initializing operation of the electronic device containing the A/D converter responsive to the detected connection;

enabling the external component to communicate with the electronic device containing the A/D converter over an SPI bus through a serial peripheral interface (SPI);

accessing a memory location within the electronic device containing initialization and configuration data enabling operation of the A/D converter with the external component, wherein the initialization and configuration data enabling operation is uniquely associated with the A/D converter;

transmitting the initialization and configuration data enabling operation of the A/D converter from the memory location to the external component;

storing the transmitted initialization and configuration data enabling operation from the memory location in a buffer associated with the external component;

transmitting the initialization and configuration data enabling operation from the buffer to the A/D converter;

receiving the initialization and configuration data enabling operation of the A/D converter at the A/D converter from the external component; and enabling operation of the A/D converter with the external component responsive to the received initialization and configuration data at the A/D converter.

13. The method of claim 12, wherein the step of accessing further comprises accessing the memory location within an electrically erasable programmable read only memory (EEPROM).

14. The method of claim 12, wherein the external component comprises a field programmable gate array.

15. The method of claim 12, wherein the external component comprises software.

16. The method of claim 12 further comprising the step of transmitting converted data from the A/D converter.

* * * * *